United States Patent [19]

Brodersen

[11] Patent Number: 5,618,021
[45] Date of Patent: Apr. 8, 1997

[54] SEAT SUSPENSION WITH RIDE ZONE PROTECTION APPARATUS

[75] Inventor: Cole T. Brodersen, Davenport, Iowa

[73] Assignee: Sears Manufacturing Company, Davenport, Iowa

[21] Appl. No.: 483,116

[22] Filed: Jun. 7, 1995

[51] Int. Cl.6 ................................................. F16M 13/00
[52] U.S. Cl. ..................... 248/550; 248/188.2; 248/562; 267/64.28; 267/131
[58] Field of Search ............................... 248/157, 188.2, 248/550, 562; 267/64.28, 131; 297/284.11, 344.16

[56] References Cited

U.S. PATENT DOCUMENTS

| | | |
|---|---|---|
| 1,291,016 | 1/1919 | Kellogg .............................. 267/64.28 X |
| 3,558,094 | 1/1971 | Radke et al. .......................... 248/550 X |
| 3,661,176 | 5/1972 | Lowe ................................... 248/550 X |
| 3,951,373 | 4/1976 | Swenson et al. ........................ 248/550 |
| 3,954,245 | 5/1976 | Costin ............................ 297/344.16 X |
| 4,779,925 | 10/1988 | Heinzel ........................... 297/344.16 X |
| 5,125,631 | 6/1992 | Brodersen et al. ..................... 257/131 |

Primary Examiner—Leslie A. Braun
Assistant Examiner—Richard M. Smith
Attorney, Agent, or Firm—Niro, Scavone, Haller & Niro

[57] ABSTRACT

According to the present invention, a ride zone protection device is provided for use with a pneumatic seat suspension, comprising a cam in communication with the air suspension actuation means to alternatively allow and prevent actuation of the air suspension based on the positioning of the vehicle seat.

8 Claims, 3 Drawing Sheets

SEAT SUSPENSION WITH RIDE ZONE PROTECTION APPARATUS

BACKGROUND OF THE INVENTION

The present invention relates generally to a seat suspension protection device and, more particularly, to a mechanical ride zone protection device for a pneumatic seat suspension having a swivel arm which pivotally moves with the seat and includes a cam which alternatively allows and prevents vertical seat adjustment.

Many vehicle seats today are vertically adjustable using an air suspension. In such suspension systems, compressed air allows the seat to be raised or lowered vertically when actuated. These seat suspension systems generally include scissors linkage or parallelogram-type mechanical connections between the seat and the vehicle frame as generally described in U.S. Pat. Nos. 3,826,457; 3,339,906; 4,125,242; and 5,125,631; all incorporated herein by reference. As such, the seats are vertically adjustable only within a defined range, called the ride zone. The air suspension system allows the seat to be lowered to its lowest vertical position and raised to its maximum vertical height.

A problem with such systems occurs when the seat occupant raises the seat to its maximum height or lowers the seat to its lowest point. At such extreme positions, the seat may provide little suspension and comfort for the seat occupant. As such, the seat is uncomfortable and may cause back ailments because the seat suspension is not working to provide suitable shock absorption.

One way to prevent such problems from occurring is to prevent the seat from being positioned to its lowest and highest positions, i.e. to prevent or regulate the air suspension system from completely charging or discharging the air spring. The present invention provides for a mechanical apparatus which prevents the air compressor from working to charge the air spring to adjust the seat to its maximum height or completely discharge the air spring to "bottom out" the suspension.

The present invention provides a mechanical apparatus which ensures that the seat remains within the intended ride zone, i.e. that the air suspension system operates to raise or lower the seat to maximum or minimum height levels that insure adequate shock absorption and comfort during normal operating conditions.

SUMMARY OF THE INVENTION

Many different types of vehicle seat suspension systems are used today. A popular type of vehicle seat suspension is a pneumatic air spring used in conjunction with a scissors arms or parallelogram linkage assembly. In such systems, the linkage assembly provides the rigid support structure while the air spring provides an actuation and suspension means to vertically adjust the seat height. In these types of seat suspension systems, a need has been found to exist to confine the vertical travel of the vehicle seat within a specified range—the ride zone. The ride zone is generally established to be that range of vertical adjustment within which the mechanical linkage assembly will work to provide comfortable support and shock absorption to the seat occupant.

It will be appreciated, therefore, that the pneumatic adjustment mechanism and the mechanical suspension device are two independent systems working together to provide seat suspension and adjustment. As such, a need has developed for a device or system to allow these two independent systems to operatively associate to prevent the pneumatic adjustment system from causing the seat to be extended above or below its maximum or minimum intended positions.

The present invention solves this problem. The present invention provides a mechanical swivel arm connected to a seat bottom which pivotally travels with the seat bottom, and a cam connected to the swivel arm which, based on the positioning of the cam relative to the seat bottom, alternatively permits or prevents the pneumatic seat suspension system to operate to raise and/or lower the seat.

A primary object of the present invention is to provide a mechanical, ride zone protection device which is connected to the air suspension system actuation means and to the seat to allow or prevent seat height adjustment depending on the vertical position of the seat.

A further object of the present invention is to provide an inexpensive ride zone protection apparatus adaptable for use with any air suspension system and easy to install and maintain to prevent vertical seat travel outside of the intended ride zone.

Therefore, according to the present invention, a ride zone protection device is provided for use with a pneumatic seat suspension, comprising a cam connected to the seat in communication with the air suspension actuation means to alternatively permit and prevent actuation of the air suspension system based on the positioning of the vehicle seat.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
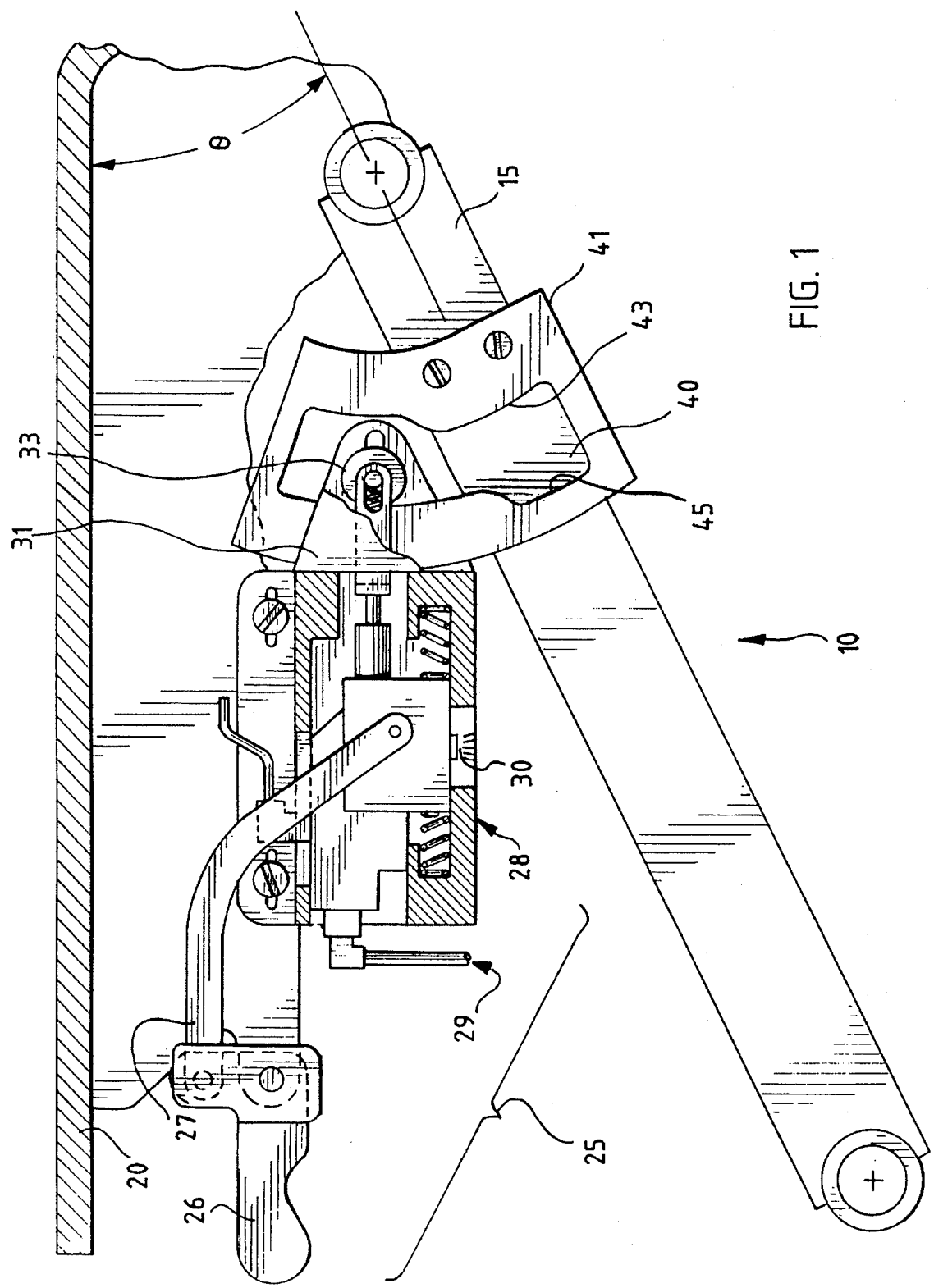
FIG. 1 is a side cross-sectional view of the present invention.
Figure 2:
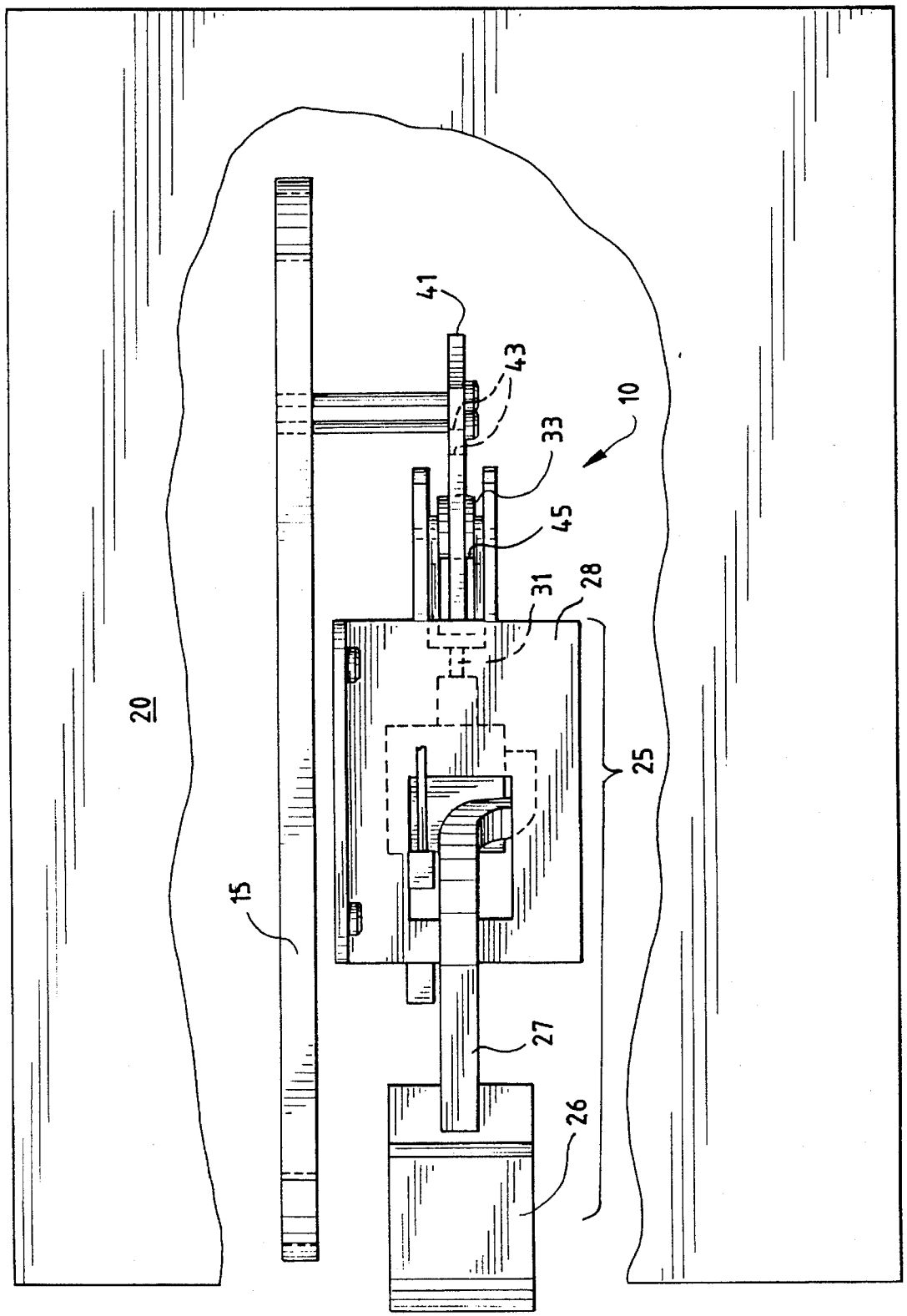
FIG. 2 is a top cross-sectional view of the present invention.

One preferred embodiment of the present invention is shown in FIGS. 1 and 2 and designated generally 10. The depicted apparatus has a swivel arm 15 pivotally connected to a seat bottom 20 adjacent air suspension actuation means 25 and carrying a cam 41 cooperating with air suspension actuation means 25. Air suspension actuation means 25 includes a knob 26, a link 27, a valve 28 having an inlet 29 and an outlet 30, and a plunger 31. While many suitable valves are well known to those of ordinary skill in the art, one such valve used in the industry is manufactured by GT Development of Seattle, Wash. and used by Sears Manufacturing of Davenport, Iowa, part no. 6450113. Extending rearward from valve 28 is plunger 31 which terminates at a free end, and in this preferred embodiment has attached thereto a roller 33. Roller 33 is disposed within an aperture 40 in cam 41.

Valve 28 operates to allow air to charge the air suspension system to raise the seat or to discharge the air suspension system to lower the seat. Valve 28 is operated by movement of knob 26 and link 27. As is common in many pneumatic valves, valve plunger 31 remains in a neutral, non-actuated position unless acted upon. Valve 28 may be actuated by either pushing or pulling plunger 31 relative to valve 28. When plunger 31 is retracted (i.e., valve 28 moves rearward relative to plunger 31), air is charged into the suspension system to raise the seat. When plunger 31 is extended (i.e., valve 28 moves forward relative to plunger 31), air is discharged from the suspension system, which lowers the seat.

Actuation of the preferred embodiment of the present invention will now be described. Knob 26 is pivotally connected to link 27 which is pivotally connected to valve 28 which is operatively connected to plunger 31. Raising knob 26 causes link 27 to move rearward which exerts a similar force on plunger 31. If roller 33 attached to plunger 31 contacts rear surface 43 of cam aperture 40, plunger 31 retracts relative to plunger 31. Plunger 31 retracting within valve 28 opens valve 28 allowing air into the suspension system to raise the seat.

On the other hand, lowering knob 26 causes link 27 to move forward with valve 28. Movement of valve 28 tends to cause plunger 31 and roller 33 to also move forward. If roller 33 contacts forward surface 45 of aperture 40, however, movement of plunger 31 is prevented, thus causing plunger 31 to extend from valve 28 which causes air to be discharged from the suspension system to lower the seat.

It will be appreciated, therefore, that aperture 40 of cam 41 is designed such that as the position of cam 41 changes relative to seat bottom 20, movement of roller 33 is restricted or unrestricted permitting or preventing extension or retraction of plunger 31 relative to valve 28. Only when valve 28 moves relative to plunger 31 (i.e. valve 28 moves and plunger 31 is prevented from so moving) will valve 28 operate to allow air into or out of the air spring suspension system.

It will be appreciated that as seat 20 is raised or lowered, the angle $\Theta$ between the swivel arm 15 and seat bottom 20 will change. As angle $\Theta$ changes and swivel arm 15 pivotally rotates, the position of roller 33 within aperture 40 will change.

Figure 5:
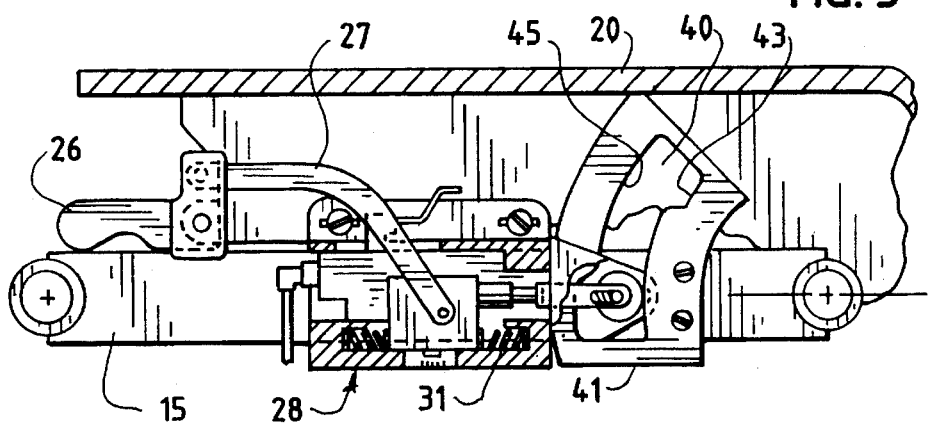
FIG. 5 is a side view of the present invention showing the seat in its lowermost intended position.

As seen in FIG. 5, when seat 20 is in its lowest intended position, swivel arm 15 will be substantially parallel to seat 20 (angle $\Theta$ thus being minimized). When in this position, roller 33 will be in the lowermost portion of aperture 40. Aperture 40 is thus designed to allow forward movement of roller 33, and thus plunger 31 with valve 28, when seat 20 is in this position. Allowing forward movement of plunger 31 with valve 28 when seat 20 is in this position prevents further discharge of air from the suspension assembly which prevents seat 20 from being lowered further. On the other hand, in this position, aperture 40 prevents rearward movement of plunger 31 which permits retraction of plunger 31 relative to valve 28 to charge the suspension system to raise the vehicle seat.

Figure 3:
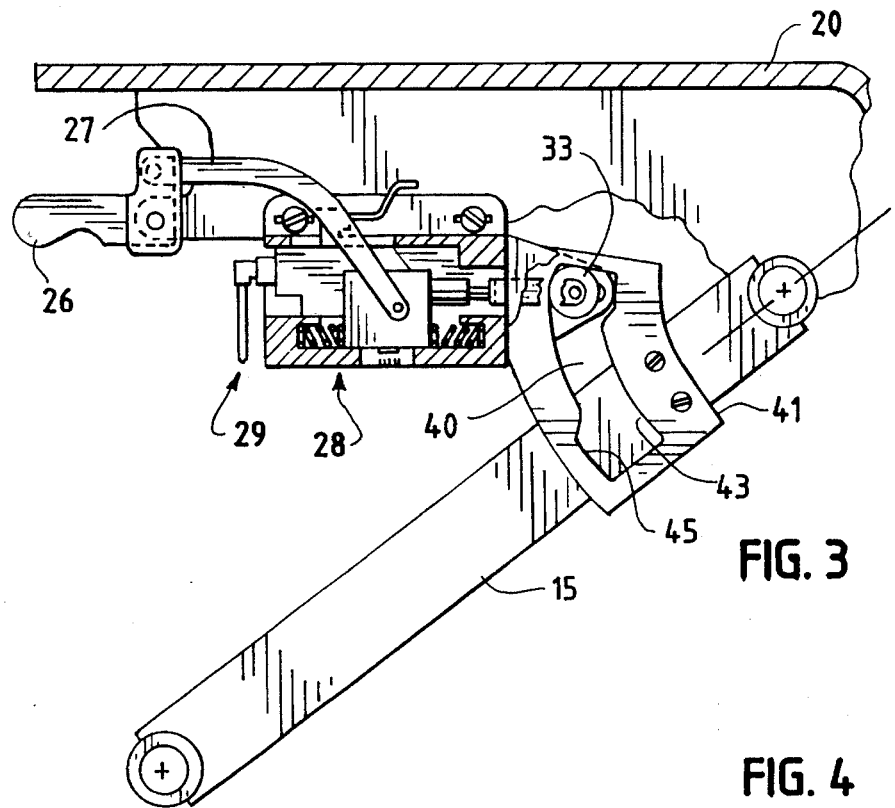
FIG. 3 is a side view of the present invention showing the seat in its uppermost intended position.

Conversely, when seat 20 is in its uppermost intended position as seen in FIG. 3 ($\Theta$ will be maximized), roller 33 will be in the uppermost portion of aperture 40. When in this position, the contours of this portion of aperture 40 work to allow rearward movement of roller 33, and, thus, plunger 31 with valve 28. Allowing rearward movement of plunger 31 with valve 28 prevents the seat occupant from charging the suspension assembly which prevents further raising of seat 20. On the other hand, in this position aperture 40 prevents forward movement of plunger 31 which allows valve 28 to discharge the system to lower the vehicle seat.

Figure 4:
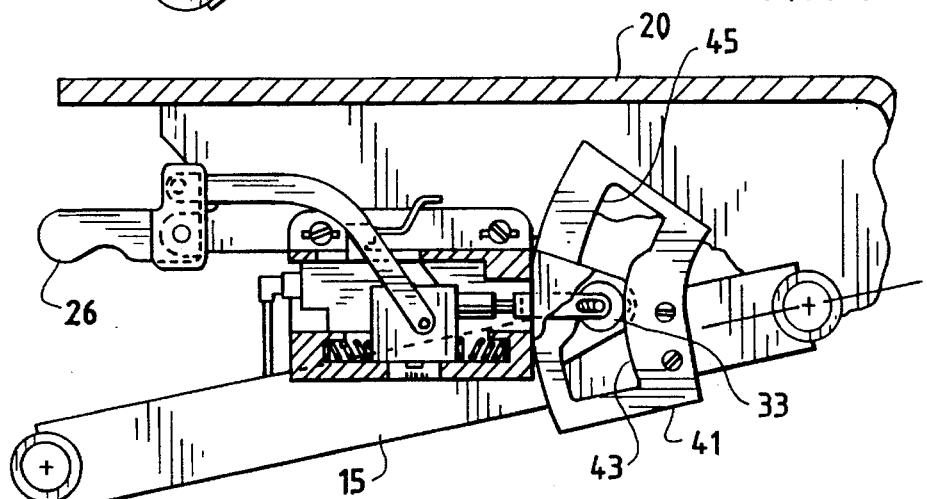
FIG. 4 is a side view of the present invention with the seat in an intermediate position.

In the third scenario as shown in FIG. 4, the seat is in any position between its lowest intended position and its highest intended position. In this scenario, roller 33 will be disposed in any possible position within aperture 40. When the seat is within this range, the air suspension system must be actuatable to both raise and lower the seat. As such, plunger 31 must be prevented from extension or retraction relative to valve 28. Aperture 40 is designed such that, when the seat is anywhere within this range, fore or aft movement of plunger 31 is prevented. Preventing both fore and aft movement of plunger 31 ensures that valve 28 can charge or discharge the system to raise and lower the seat.

It will be appreciated by those of ordinary skill in the art that many variables will affect the shape and contours of aperture 40, including but not limited to the size and shape of roller 33 and aperture 40, the length of plunger 31, the intended ride zone, the placement of swivel arm 15, and the placement of cam 41.

The present invention thus provides a reliable, mechanical system which ensures ride zone protection for a vehicle seat using a pneumatic seat suspension system. The present invention provides a communicative bridge between a mechanical seat support system and the pneumatic seat suspension system used to adjust the height of the seat.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A seat suspension having a mechanical linkage including at least one linkage arm between a base and a seat, a pneumatic actuator including a valve connected to and moveable with the seat which allows air to be charged to or discharged from the actuator to raise or lower the seat relative to the base, and a ride zone protection apparatus, comprising:

a cam connected to and movable with the at least one linkage arm and having an aperture having surface contours;

a plunger having a first end operatively connected to the valve and a second free end disposed within the aperture and engageable with said surface contours; and the surface contours of the aperture being configured to permit or prevent movement of the plunger relative to the valve depending on the vertical position of the seat, thus permitting or preventing operation of the valve to cause the seat to be raised or lowered.

2. The seat suspension of claim 1 wherein the mechanical linkage is a scissors linkage.

3. The seat suspension of claim 1 wherein the mechanical linkage is a parallelogram linkage.

4. The seat suspension of claim 1 wherein the actuator comprises an air spring.

5. The seat suspension of claim 1 wherein the plunger has multiple positions relative to the valve including at least a neutral position in which the valve substantially prevents air from entering or exiting the actuator, an intake position in which the valve allows air into the actuator, and a vent position in which the valve allows air to be discharged from the actuator.

6. The seat suspension of claim 1 further comprising a lever operably attached to the valve accessible to a seat occupant to actuate the valve to lower or raise the seat.

7. The seat suspension of claim 1 wherein the cam is plastic.

8. The seat suspension of claim 1 wherein the valve is biased in a neutral position in which the valve substantially prevents the actuator from being charged or discharged.

* * * * *